Oct. 2, 1928.
F. A. HECHT, JR
1,686,000
CONTROL BOARD FOR ELEVATORS
Filed May 26, 1924     2 Sheets-Sheet 1
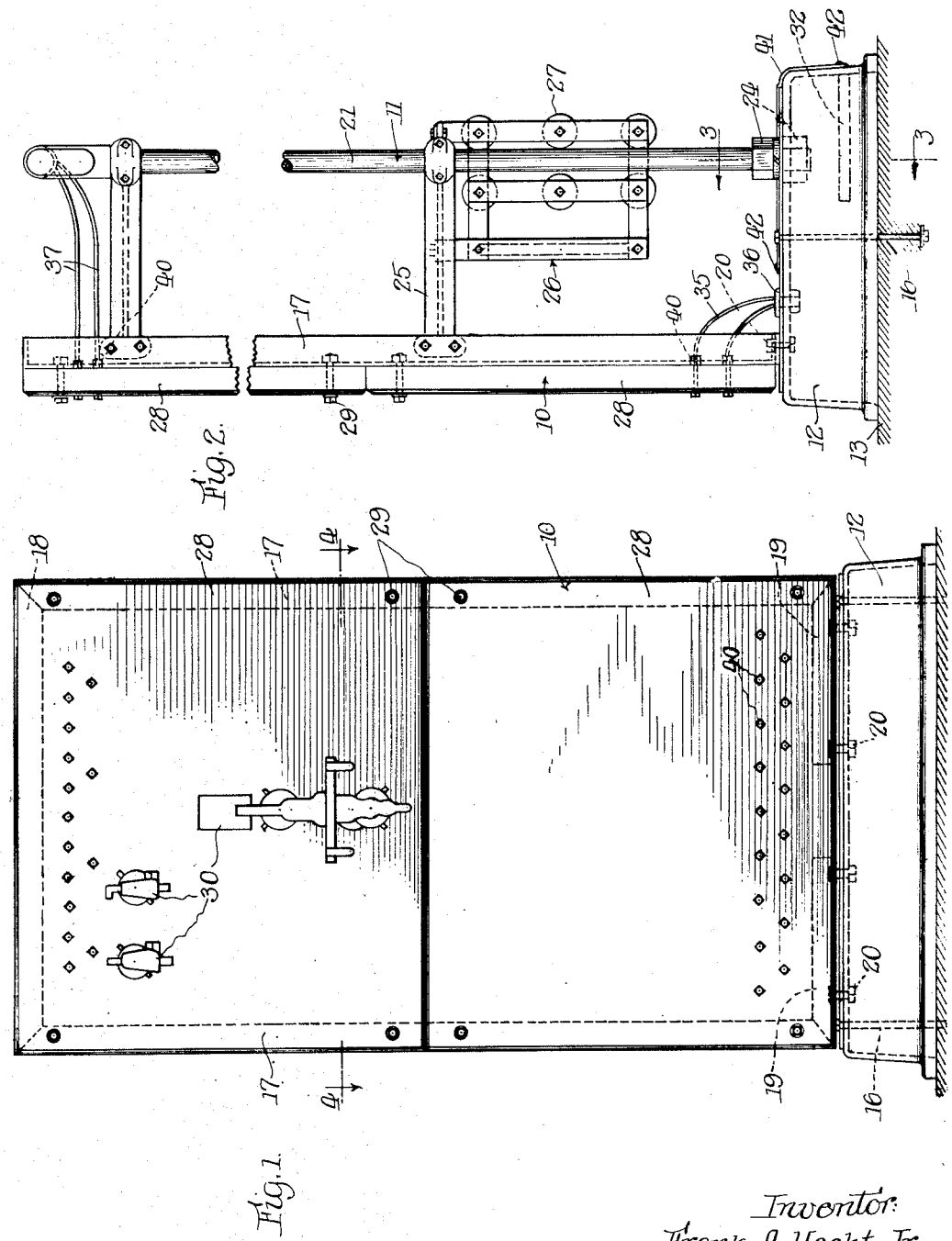

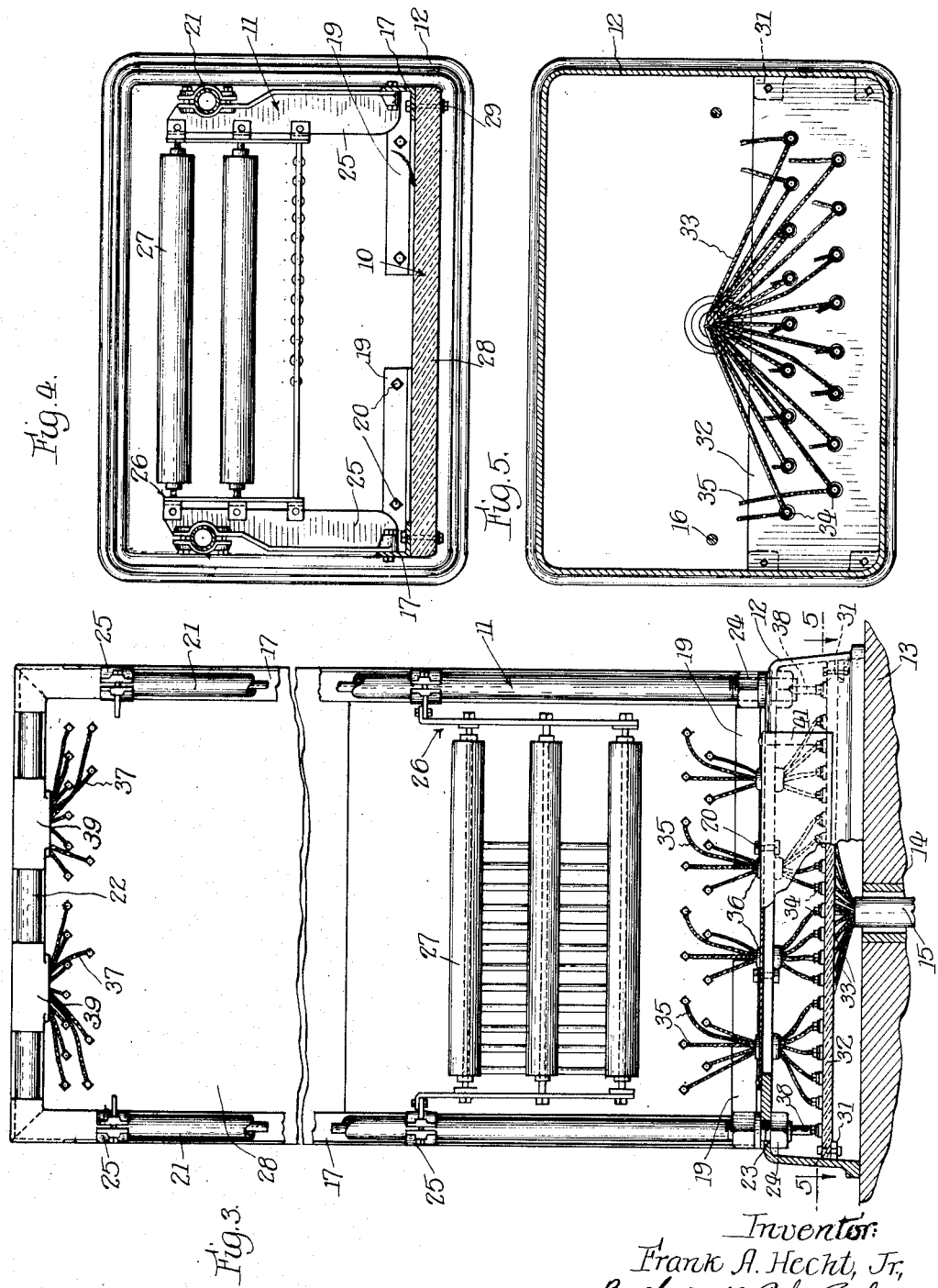

Patented Oct. 2, 1928.

1,686,000

UNITED STATES PATENT OFFICE.

FRANK A. HECHT, JR., OF CHICAGO, ILLINOIS, ASSIGNOR TO KAESTNER & HECHT COMPANY, OF CHICAGO, ILLINOIS, A CORPORATION OF ILLINOIS.

CONTROL BOARD FOR ELEVATORS.

Application filed May 26, 1924. Serial No. 716,078.

The present invention relates to improvements in control boards for electrically controlled or electric elevator systems.

Control boards of this character commonly comprise a main panel of insulating material in which many of the electrical units or devices, such as electromagnetic switches and relays, for controlling the opening and closure of the different circuits of the elevator system are mounted. Heretofore, the heavy wiring has been done at the top of the board, the lead wires being directed therefrom to all parts of the panel in a snarled and complicated manner. As a result, prior control boards have been confusing and unsightly in appearance, and the electrical units thereon have been illogically arranged. The wiring has been unsafe and unserviceable thereby giving rise to fire hazard, bad electrical connections, and deterioration of the insulation. The above features are particularly disadvantageous when the control boards, as is usually the case, are located in the basements of the buildings in which the elevators are installed, or in other out-of-the-way places where the lead wires and connections are exposed to dirt, moisture and injury.

The primary object of my invention therefore is to provide a self-contained control panel board for electric elevator systems in which the incoming conduits, the conduit connections, and a major part of all the lead wires to the panel are completely enclosed by a unitary supporting structure to protect them from dirt, moisture, mechanical injury and the like, whereby fire hazard and the probability of poor electrical connections are reduced, and increased efficiency, serviceability and safety are obtained.

Another object is to provide a control board for elevator systems in which the incoming electrical conduit is conducted from below into a closed supporting structure, and therein connected to individual lead wires extending from different parts of said support out to adjacent parts of the panel, thereby providing for a logical and advantageous arrangement of the control elements on the panel unhampered by wiring difficulties, and obtaining a compact and simple construction neat and artistic in appearance.

A further object is to provide a control board for elevator systems comprising a closed base and hollow vertical standards for supporting the panel and for substantially enclosing and guiding the incoming conduits and lead wires.

Still another object is to provide a self-contained control board for electrically controlled elevators which comprises a completely wired panel and a junction box to which the leads from the panel are connected, so that the board can be manufactured as a complete operative unit and can be easily and quickly installed by merely connecting the leads from the conduit to the terminal board of the junction box.

A general object is to provide a control board of pleasing appearance which is compact and sturdy in construction, and in which the wiring is enclosed, protected, and efficiently distributed.

Further objects and advantages will become apparent as the description proceeds.

In the accompanying drawings wherein I have illustrated the preferred embodiment, Figure 1 is a front view of a control board constructed according to my invention.

Fig. 2 is a side view thereof.

Fig. 3 is a rear view partially sectioned in the plane of line 3—3 of Fig. 2.

Fig. 4 is a horizontal section taken in the plane of line 4—4 of Fig. 1.

Fig. 5 is a horizontal section through the base taken in the plane of line 5—5 of Fig. 3.

While I have shown in the drawings and will herein describe in detail the preferred embodiment of my invention for purposes of illustration, it is to be understood that I do not thereby intend to limit my invention, but aim in the appended claims to cover all legitimate modifications and alternative constructions falling within the spirit and scope of the same.

In its exemplary embodiment, the invention consists of a vertical panel 10 secured to the front of a supporting frame 11 on a main base 12. The base 12 preferably is a shallow closed casting of rectilinear dimensions open on its lower side and adapted to set on a floor 13 of concrete or other suitable material over an inlet tube 14 extending up through the floor for admitting an electrical conduit 15. A plurality of bolts 16 having their heads embedded in the concrete floor 13 serve to hold the base 12 rigidly in place.

The frame 11 is made up of a plurality of angle irons suitably joined together to form a support for the panel 10 at the front edge of the base 12. In the present instance, two vertical irons 17 are connected at the top by an iron 18, and at the bottom to a pair of horizontal irons 19 which are rigidly attached to the upper wall of the base 12 by a plurality of bolts 20. Extending up from the rear of the base 12 to substantially the same height as the irons 17 are a pair of hollow tubular standards 21 connected at their upper end by a cross member 22. The lower ends of the standards 21 extend through holes 23 in the top of the base 12, and have nuts 24 threaded thereon to hold them firmly in position. To obtain rigidity, the angle irons 17 are connected at several points along their length to the standards 21 by arms or brackets 25, preferably T-shaped in cross-section. Mounted across the central legs of the two lower arms 25 and between the standards 21 is a depending frame 26 supporting a plurality of resistance coils 27.

The panel 10 comprises a pair of slabs or boards 28 of any suitable insulating material secured to the front legs of the angle irons 17 by a plurality of bolts 29. Any desired number of suitable electrical devices 30, such as electromagnetic switches for controlling the operation of the elevator, are adapted to be mounted on the front of the panel 10.

The wiring will now be described. Mounted within the base 12 on lugs 31 extending inwardly from the side walls is a terminal board 32 of insulating material. Lead wires 33 from the conduit 15 are connected to a plurality of terminal binding posts 34 on the board 32. Attached to the posts 34 are a plurality of lead wires 35 passing from the base 12 through a number of insulating bushings 36 in the top to the electrical devices 30 on the lower half of the panel 10. Other lead wires 37 are collected from the terminal board 32 into a pair of conduits 38 which extend upwardly through the hollow standards 21 and pass from the standards 21 and cross member 22 through outlet boxes 39 connected therein to the electrical devices 30 on the upper portion of the panel 10. In the present instance, the wires 35 and 37 are attached to the rear ends of a plurality of binding parts 40 extending through the panel 10 to their respective units 30. To facilitate making the connections on the terminal board 32, the base 12 is provided with a removable cover 41 opening at the top and rear, and normally held in place by screws 42.

By this construction, the wiring is distributed from the base instead of the top of the panel board. The terminal connections with the conduit are completely enclosed by the base which in effect is a junction box. Lead wires to the lower half of the panel pass out directly through the top of the base, and wires to the upper half of the panel extend upward through the supporting standards for the panel and are distributed from the top of the frame 11. Thus most of all the wires to the panel is completely enclosed and out of view. The wires are not tangled at the back of the panel and are well protected. The bulk of the wiring can be done at the factory. All that is necessary for installing the control board is to connect the lead wires from the conduit to the terminal posts in the base 10. The device is neat, artistic, safe, and serviceable.

I claim as my invention:

1. A control panel board comprising, in combination, a closed base open on its lower side and having a removable cover, a supporting frame mounted on said closed base and comprising a pair of hollow tubular standards, a vertical panel secured to the front of said frame for supporting a plurality of electrical devices, a terminal board mounted within said base and supporting a plurality of terminal binding posts, an incoming electrical conduit extending into said base from below and having its wires connected to said binding posts, a plurality of lead wires attached to certain of said binding posts and extending directly out of said base to the lower portion of said panel, and a plurality of lead wires attached to others of said binding posts and passing through said hollow standards to the top of said frame from where they are distributed to the electrical devices on the upper portion of said panel.

2. A control board for elevators comprising, in combination, a base open at the bottom and having a removable cover plate closing the top, a rectangular support mounted along the front edge of said base, a pair of hollow tubular standards extending up from the rear of said base and connected at their upper ends by a hollow cross member, a plurality of outlet boxes connected in said cross member, a plurality of arms connecting said support and said standards, a panel on said support, a plurality of binding posts on said panel, a terminal plate mounted within said base and supporting a plurality of terminal binding posts, a plurality of bushings mounted in the top of said base, an electrical conduit extending into said base from below, the lead wires of said conduit being attached to said terminal binding posts, lead wires attached to certain of said terminal binding posts and passing through said bushings out of said base to binding posts on the lower portion of said panel, and lead wires attached to others of said terminal posts and passing through said tubular standards out of said outlet boxes to binding posts on the upper half of said panel, and electrical devices mounted on said panel in electrical connection with said binding posts.

3. A control board for elevators comprising, in combination, a closed base, a supporting frame mounted on said base, said frame having a plurality of hollow vertical standards, a panel secured to the front of said frame, a terminal board mounted within said base, wires extending from said terminal board and said base directly to the lower portion of said panel, and other wires extending from said board through said hollow standards to the upper portion of said panel, and devices on said panel having electrical connections with said leads.

4. A control board for elevators comprising, in combination, a closed base, a supporting frame mounted on said base, a panel secured to the front of said frame, an electrical conduit extending into said base, and lead wires for connecting said conduit to said panel, the lead wires to the lower portion of said panel passing directly out of said base to said panel, and the lead wires to the upper portion of said panel extending from said base through closed parts of said frame to the upper end of said frame and from there to the upper portion of said panel.

5. A control board for elevators comprising, in combination, a closed base, a frame comprising a pair of vertical tubular standards, outlet boxes connected in the upper portion of said frame in communication with said standards, an electrical conduit extending into said base, and a plurality of lead wires connected with the wires of said conduit, certain of said lead wires passing directly out of said base to electrical devices on the lower portion of said panel, and others of said lead wires passing out of said base through said tubular standards and outlet boxes to electrical devices on the upper portion of said panel.

6. A control board for elevators comprising, in combination, a base, means for holding said base in position, a pair of hollow standards extending up from said base and communicating with the interior thereof, a panel supported on said base, a plurality of electrical devices mounted on said panel, a conduit extending into said base, lead wires connected with said conduit, certain of said wires extending from said base through said standards to the electrical devices on the upper portion of said panel, and others of said lead wires extending directly from said base to the electrical devices on the lower portion of said panel.

7. A control board for elevators comprising, in combination, a closed base having a removable cover plate, means for holding said base in poistion, a pair of hollow standards extending up form said base and communicating with the interior thereof, a panel board supported in front of said standards, lead wires extending from said base through said standards to electrical devices on said panel, and junction means within said base for connecting said lead wires to an incoming conduit.

8. A control board for elevators comprising, in combination, a closed base, a frame mounted on said base, said frame having a hollow vertical member extending substantially to the top thereof and communicating with the interior of said base, a panel mounted on said base and secured to said frame, a terminal board in said base, a plurality of electrical devices mounted on said panel, lead wires extending into said hollow member from said board and out of said member to said electrical devices.

In testimony whereof, I have hereunto affixed my signature.

FRANK A. HECHT, Jr.